US012648613B2

(12) United States Patent
Maccapani et al.

(10) Patent No.: US 12,648,613 B2
(45) Date of Patent: Jun. 9, 2026

(54) SOLE STRUCTURE AND SHOE

(71) Applicant: adidas AG, Herzogenaurach (DE)

(72) Inventors: Federico Maccapani, Portland, OR (US); Arnau Sanjuan Roman, Portland, OR (US); Eric Weiss, Portland, OR (US)

(73) Assignee: adidas AG, Herzogenaurach (DE)

( * ) Notice: Subject to any disclaimer, the term of this patent is extended or adjusted under 35 U.S.C. 154(b) by 10 days.

(21) Appl. No.: 18/494,487

(22) Filed: Oct. 25, 2023

(65) Prior Publication Data

US 2025/0134204 A1    May 1, 2025

(51) Int. Cl.
| | |
|---|---|
| *A43B 13/12* | (2006.01) |
| *A43B 13/18* | (2006.01) |
| *B29D 35/12* | (2010.01) |

(52) U.S. Cl.
CPC .......... *A43B 13/125* (2013.01); *A43B 13/186* (2013.01); *B29D 35/122* (2013.01)

(58) Field of Classification Search
None
See application file for complete search history.

(56) References Cited

U.S. PATENT DOCUMENTS

| | | | | |
|---|---|---|---|---|
| 4,658,515 A | * | 4/1987 | Oatman ................. | A43B 17/14 36/31 |
| 4,686,781 A | * | 8/1987 | Bury ........................ | A43B 3/00 36/11.5 |

| | | | | |
|---|---|---|---|---|
| 4,829,682 A | * | 5/1989 | Gasbarro ............... | A43B 13/20 36/11.5 |
| 5,185,942 A | * | 2/1993 | Decker .................. | A43B 13/20 36/1 |
| 5,231,776 A | * | 8/1993 | Wagner ................ | A43B 19/005 482/79 |
| 5,617,650 A | * | 4/1997 | Grim ...................... | A43B 7/147 36/154 |
| 6,061,928 A | * | 5/2000 | Nichols ................ | A43B 13/181 36/28 |
| 6,848,200 B1 | * | 2/2005 | Westin ................. | A43B 13/187 36/8.4 |
| 7,013,581 B2 | * | 3/2006 | Greene .................. | A43B 13/38 36/31 |
| 7,805,859 B2 | * | 10/2010 | Finkelstein .......... | A43B 13/188 36/153 |
| 10,231,680 B2 | * | 3/2019 | Coppens .................. | A61N 5/10 |
| 11,229,260 B2 | * | 1/2022 | Levy ......................... | B32B 5/16 |
| 11,284,671 B2 | | 3/2022 | Hurd et al. | |

(Continued)

FOREIGN PATENT DOCUMENTS

| | | |
|---|---|---|
| EP | 3261477 B1 | 6/2020 |
| EP | 4009827 B1 | 9/2023 |

*Primary Examiner* — Jila M Mohandesi
(74) *Attorney, Agent, or Firm* — Kilpatrick Townsend & Stockton LLP

(57)    ABSTRACT

A sole structure for a shoe and a method of manufacturing the sole structure with additive manufacturing is provided. A midsole structure is integrally formed with a midsole shell having an upper platform and lower platform integrally formed to define a cavity therebetween. A plurality of cushion elements is retained in the cavity. Each of the plurality of cushion elements is movable independently in the cavity. The midsole shell and the cushion elements formed together in a three-dimensional printing process.

20 Claims, 4 Drawing Sheets

(56)     References Cited

U.S. PATENT DOCUMENTS

| | | | |
|---|---|---|---|
| 11,291,273 B2 | 4/2022 | Hartmann et al. | |
| 12,268,276 B2 * | 4/2025 | Reddy | A43B 1/0072 |
| 2006/0130363 A1 * | 6/2006 | Hottinger | A43B 13/187 |
| | | | 36/11.5 |
| 2013/0145653 A1 * | 6/2013 | Bradford | A43B 13/42 |
| | | | 36/103 |
| 2015/0313313 A1 * | 11/2015 | Bradford | A43B 13/42 |
| | | | 36/103 |
| 2019/0037969 A1 * | 2/2019 | Busbee | B01F 27/092 |
| 2020/0085140 A1 | 3/2020 | Hurd et al. | |
| 2020/0181351 A1 * | 6/2020 | Bailey | A43B 13/04 |
| 2021/0219655 A1 | 7/2021 | Duemler et al. | |
| 2022/0232928 A1 * | 7/2022 | Reddy | A43B 13/42 |

* cited by examiner

SOLE STRUCTURE AND SHOE

TECHNICAL FIELD

The present application relates to sole structure for shoes and a method of additive manufacturing of the same.

BACKGROUND

Footwear typically includes an upper and a sole. The shoe upper secures the shoe to the wearer's foot and may be made of leather, and/or synthetic materials to comfortably cover the wearer's foot and provide protection and ventilation. The sole is the part of the shoe that sits below the wearer's foot. In athletic footwear in particular, the sole may be constructed of several layers such as an insole, a midsole, and an outsole. The outsole is the outer layer of the sole that contacts the ground and may provide the grip, durability, and water resistance. The insole is inside the shoe and contacts the bottom of the wearer's foot. The insole may be a thin layer and provide some cushioning and create a comfortable layer for the wearer's foot.

The midsole is a layer between the insole and the outsole and typically forms the middle layer of the sole structure. The midsole helps provide extra energy absorption and ground reaction force attenuation in athletic shoes. The midsole can also be contoured to the wearer's foot to provide specific support to the user's arch, heel and forefoot, for example. The midsole may also be formed to help other functions such as controlling foot pronation or other unwanted foot motions.

The midsole is typically formed of a resilient foam material that extends along the length of the shoe. The properties, dimensions, and type of the foam in the midsole may vary to meet the specific requirements of the activity for which the shoe is intended to be used.

One example of athletic footwear with a unique midsole is shown in German Patent Application DE102020200558.3 filed on Jan. 17, 2020, and relates to a sole for a shoe, in particular a running shoe. The shoe comprises a sole component and at least one loose particle contained within the sole component. The loose particles provide haptic feedback to a user of the sole during an athletic activity.

SUMMARY

The present application provides a sole structure for footwear and the method of manufacturing of the same. The footwear can be designed as an athletic shoe, boot, slide sandal, or other suitable type of shoe.

According to at least one embodiment, a sole structure for a shoe is provided. A midsole structure is integrally formed of a midsole shell and a plurality of cushion elements. The midsole shell has an upper platform and lower platform integrally formed to define a cavity therebetween. The cushion elements are retained in the cavity and each of the cushion elements is movable independently in the cavity.

In another embodiment, the upper platform comprises an upper surface defining a footbed contoured to receive a wearer's foot.

In another embodiment, the upper platform has a plurality of apertures that extend from the upper surface through to the cavity. Each aperture is smaller than any of cushion elements.

In another embodiment, the midsole shell extends from a heel portion to a toe portion. The midsole shell has a medial side portion and a lateral side portion extending between the upper platform and lower platform.

In another embodiment, the midsole shell defines the cavity as an enclosed cavity formed between the medial side portion, the lateral side portion and the upper platform and lower platform, wherein the plurality of cushion elements are contained in the enclosed cavity.

In another embodiment, the cushion elements include a first group of cushion elements having a first density and a second group of cushion elements having a second density different than the first density.

In another embodiment, the cushion elements include a first group of cushion elements being solid and a second group of cushion elements being hollow.

In another embodiment, the cushion elements have a generally spherical shape.

In another embodiment, the cushion elements are formed of at least two different shapes or two different sizes.

In another embodiment, the sole structure includes an outsole attached to the midsole structure.

According to at least one embodiment, a sole structure for a shoe is provided with a midsole structure integrally formed with a 3D printing process. The midsole shell has an upper platform and lower platform integrally formed with the 3D printing process to define a cavity therebetween. A cushion portion is formed by the 3D printing process and is retained in the cavity separate from the midsole shell.

In another embodiment, the sole structure includes an outsole integrally formed with the midsole structure by the 3D printing process.

In another embodiment, the cushion portion comprises a plurality of cushion elements comprising a first group of cushion elements having a first cushion characteristic and a second group of cushion elements having a second cushion characteristic that varies from the first cushion characteristic. The first and second cushion characteristics comprise at least one of density, shape, size, hardness, and elasticity.

In another embodiment, each of the plurality of cushion elements is movable independently in the cavity.

According to at least one embodiment, a method of additive manufacturing a sole of footwear is provided. A midsole shell and a plurality of cushion elements are three-dimensional printed concurrently. The midsole shell is three dimensional printed to defines an internal cavity. The cushion elements are concurrently three-dimensional printed with the midsole shell that the cushion elements are retained and independently movable in the internal cavity.

In another embodiment, three-dimensional printing of the midsole shell includes at least one of selective laser sintering (SLS), stereolithography (SLA) or fused deposition modeling (FDM).

In another embodiment, three-dimensional printing the midsole shell includes three-dimensional printing an upper platform and a lower platform integrally formed to define the internal cavity therebetween.

In another embodiment, an outsole is concurrently three-dimensional printed with the midsole shell.

In another embodiment, the method includes attaching an outsole to the midsole shell by at least one of gluing, cementing, sewing or interlocking.

In another embodiment, the method includes receiving input of wearer's preferences. The cushion elements are three-dimensional printed to have a variable cushion characteristic based on the input of wearer's preferences.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
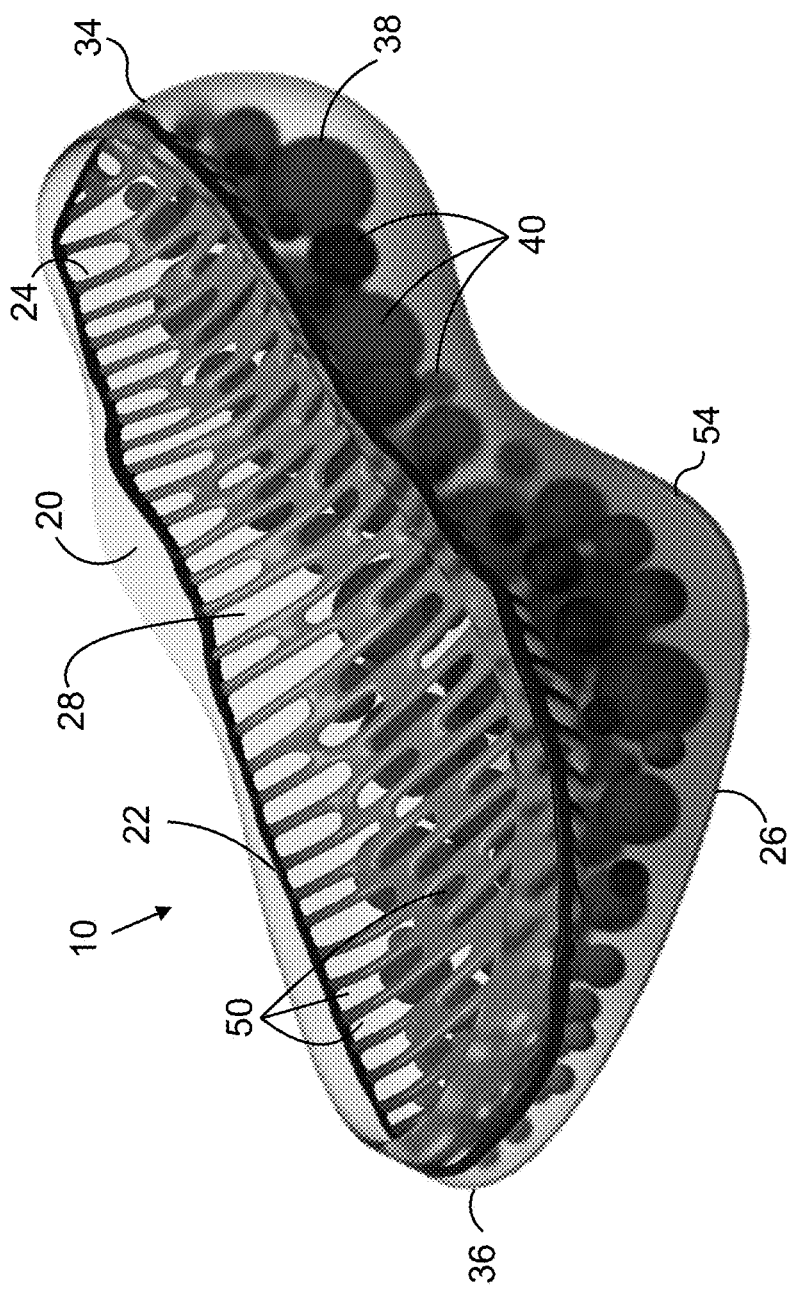
FIG. 1 illustrates a top perspective view of a sole structure for footwear according to one embodiment, where the outer shell is illustrated as clear to show the interior cushion elements.

FIG. 1 illustrates a sole structure 10 of a shoe formed by additive manufacturing, also referred to as three-dimensional printing or 3D printing. The sole structure 10 includes a midsole structure 20 integrally formed by 3D printing. The midsole structure 20 includes a midsole shell 22 having an upper platform 24 and a lower platform 26 and defining a cavity 28 in-between. The midsole structure 20 includes a cushion portion 38. As illustrated, the cushion portion 38 has a plurality of cushion elements 40. The cushion elements are 3D printed in the same process as the midsole shell 22. As the midsole shell 22 is printed around the cushion elements 40, the cushion elements 40 are then retained in the cavity 28 at the completion of the 3D printing process. The cushion elements 40 are each printed and once 3D printed and processed, can then be separate from the midsole shell 22. The cushion elements 40 may be loose and/or free-floating so that the cushion elements 40 are independently movable in the cavity 28.

Prior art sole structures with midsoles and cushion elements include multiple parts that are each manufactured separately and subsequently assembled manually. In contrast to these prior sole structures, the midsole structure 20 is entirely printed in one process. The creation of a midsole structure 20 in one step decreases manufacturing time, labor time and overall costs.

Additionally, the cushion elements 40 being separate from the midsole shell provide numerous advantages. For example, the cushion elements 40 may create an adaptive cushioning and haptic feedback, such as discussed in German Patent Application DE102020200558.3 filed on Jan. 17, 2020, the disclosure of which is hereby incorporated by reference herein.

For example, the arrangement of loose cushion elements 40 in a heel region may provide a user with increased cushioning when landing on the heel while running. In addition, the wearer can distinguish between a landing in the heel region or in the forefoot region based on the different cushioning that may provide haptic feedback perceived by the wearer's foot. This type of feedback may help make changes or improvements to running technique or help the wearer to adapt their technique faster.

Adjusting the cushioning in different regions may also allow the wearer to adapt the footwear for their specific use or running style. The different cushioning in different regions can help reduce the risk of injury. The different cushioning can also provide more customizable support based on the wearer's running style or other comfort and cushioning desired by each wearer. Therefore, the different combinations of cushioning can help the wearer increase efficiency, improve technique, improve speed, improve agility, support recovery, reduce the risk of injury and/or the loss of energy, among other benefits.

Additionally, in the embodiments where the cushion elements 40 are able to move free and independently within the midsole cavity 28, it may create a perception for the wearer of the article of footwear like walking on sand. The distribution of the free and independently moveable cushion elements within the midsole cavity is randomly assembled with every step of the wearer during the gait cycle.

The sole structure 10 formed using additive manufacturing allows the midsole structure 20 to be integrally formed in a single 3D printing process. The midsole shell 22 is formed with the 3D printing process to have the upper platform 24 and the lower platform 26 integrally formed and defining the cavity 28. The cushion elements 40 are formed by the same 3D printing process and become retained in the cavity 28 but may be separate from the midsole shell 22.

The midsole shell 22 also has a medial side 30 and a lateral side 32 extending between the upper platform 24 and lower platform 26. The upper and lower platforms 24, 26 and medial and lateral sides 30, 32 extend from a heel portion 34 to a toe portion 36 and define the outer perimeter of the midsole shell 22. As the midsole shell 22 is printed around the cushion elements 40, the cushion elements 40 are then retained in the cavity 28 at the completion of the 3D printing process. The midsole shell 22 may form an enclosed cavity where the cavity is surrounded on all sides. The enclosed cavity 28 may be formed between the medial side 30, the lateral side 32 and the upper platform 24 and lower platform 26 so that the cushion elements 40 are retained in the enclosed cavity 28.

Figure 2:
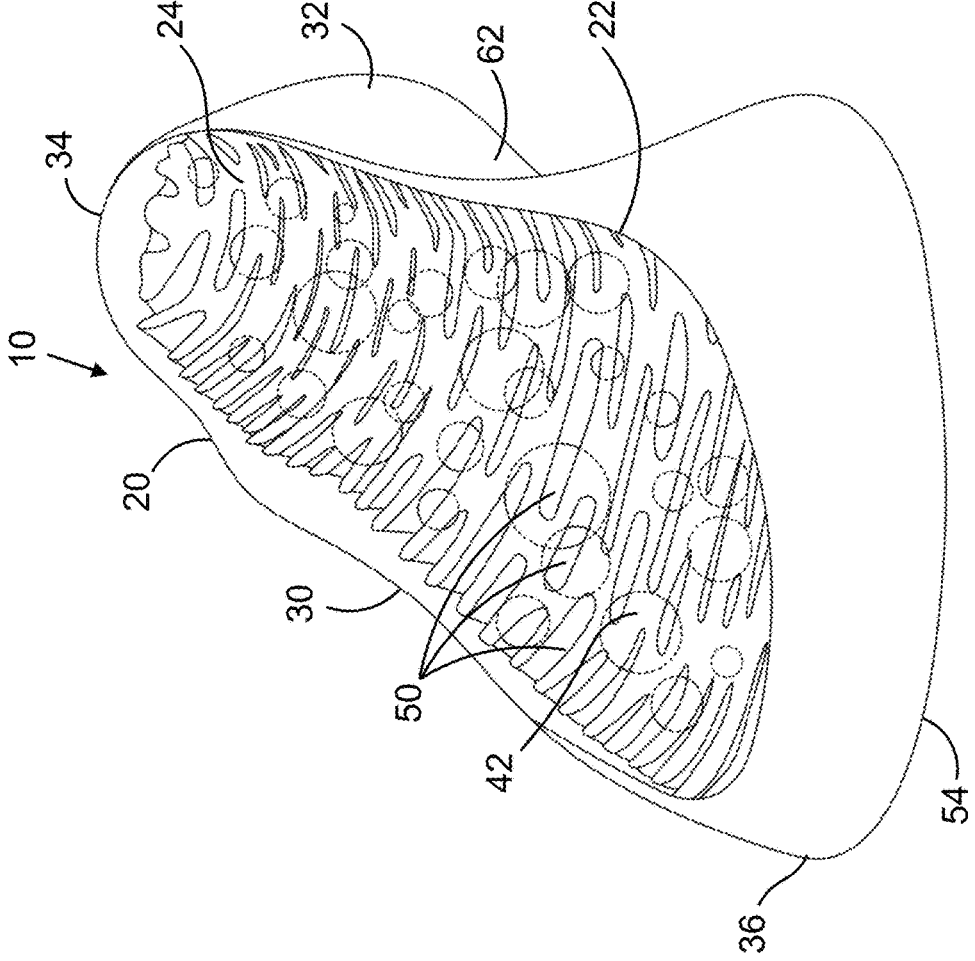
FIG. 2 illustrates a front-top perspective view of the sole structure for footwear of FIG. 1, with the outer shell shown solid.
Figure 3:
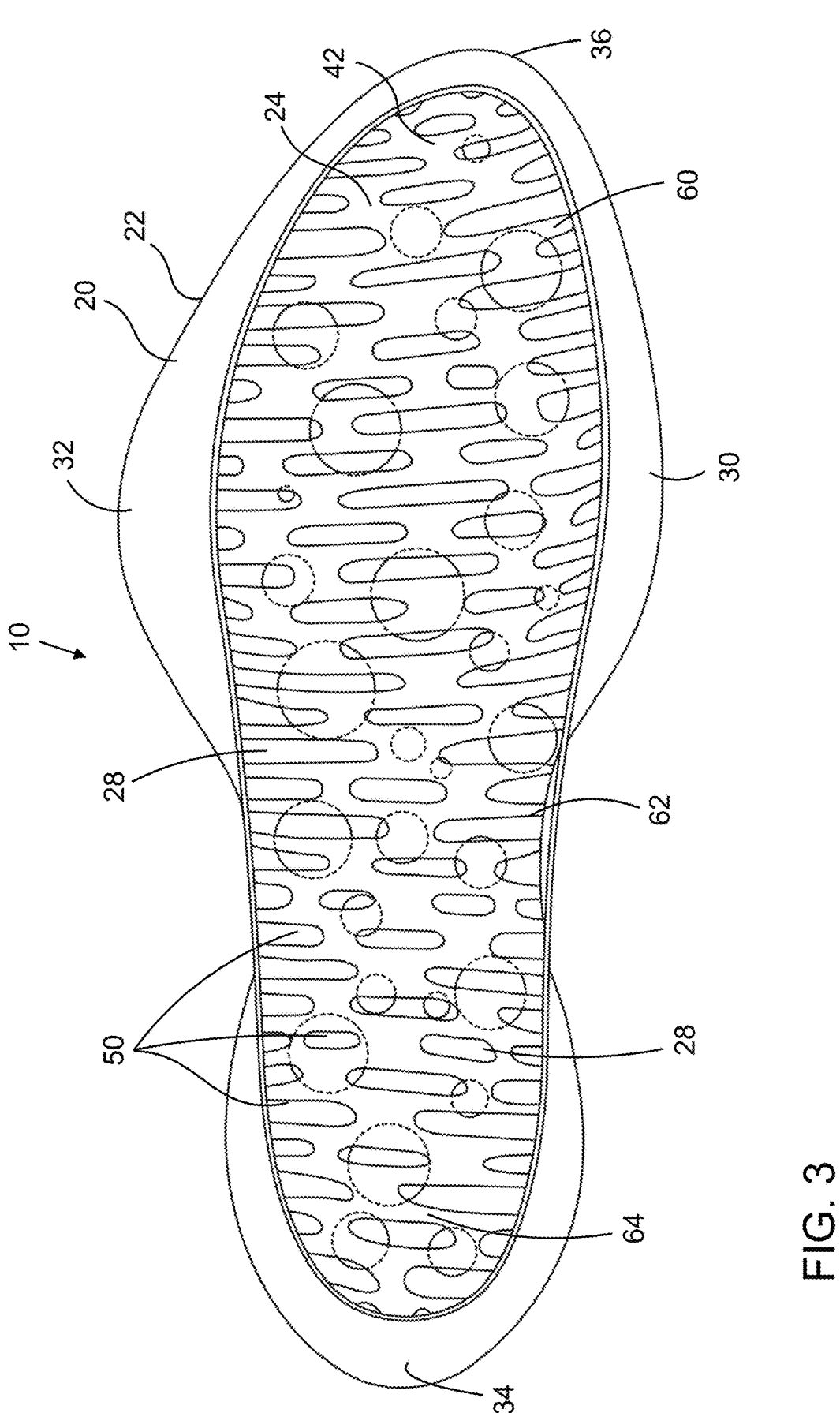
FIG. 3 illustrates a top perspective view of the sole structure for footwear of FIG. 2.
Figure 4:
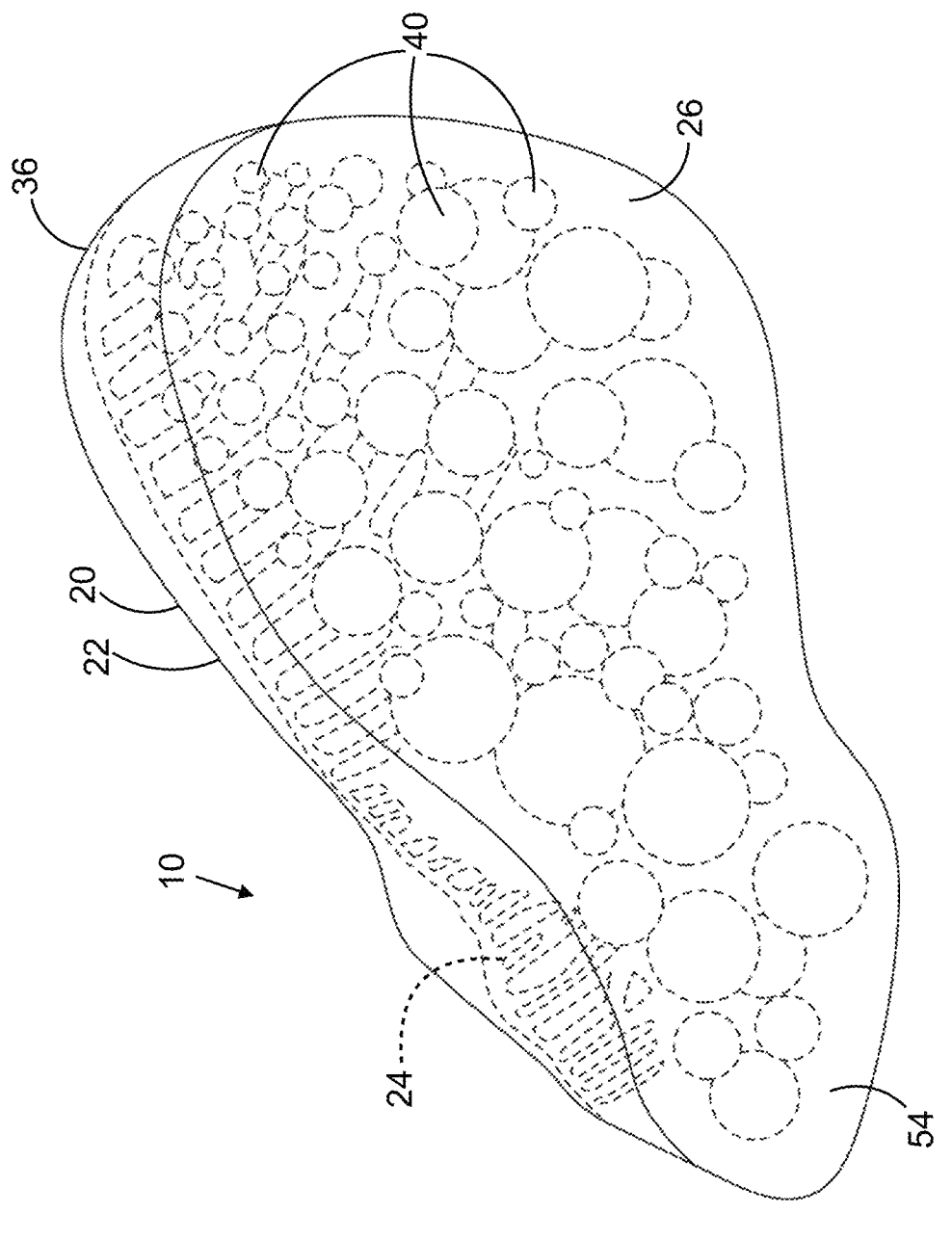
FIG. 4 illustrates a bottom perspective view of the sole structure for footwear of FIG. 1, where the outer shell is illustrated as clear to show the interior cushion elements.

As shown in FIGS. 1-3, the upper platform 24 may have a plurality of apertures 50 that extend from the upper surface 42 through to the cavity 28. Each aperture 50 may be smaller than each cushion element 40 to ensure the cushion elements 40 are retained in the cavity 28.

The upper platform 24 may also have apertures 50 of various sizes. For example, the upper platform 24 may have apertures 50 formed as different sized openings, as shown in FIGS. 1-3. Further, the midsole shell 22 may be formed as a shell web, such as a structure or pattern of elements that define the plurality of apertures 50. For example, the medial side 30 and the lateral side 32 may include web apertures that extend through to the cavity 28 so that the cushion elements 40 are visible. The apertures in the medial and lateral sides 30, 32 may be formed as different sized openings or web apertures defined by the web pattern. Alternatively, the medial side 30 may have a first size of apertures and the lateral side 32 may have a second size of apertures.

In another embodiment, the apertures 50 may be sized to allow the cushion elements 40 to be exposed through the apertures 50 and may allow the cushion elements 40 to be in direct contact with a wearer's foot. By contacting the wearer's foot, the cushion elements may provide additional comfort or may create a massaging effect, which may provide the wearer with pain relief or may also allow the wearer to have increased/prolonged recreation.

In another embodiment, the midsole shell 22 may form a closed cavity 28 to retain the cushion elements 40. The closed cavity may not have any apertures in the midsole shell 22.

The upper platform 24 of the midsole shell 22 may have an upper surface 42 defining a footbed contoured to receive a wearer's foot. A separate insole having a comfort layer of cushioning may be placed over the upper surface 42. Alternatively, the insole may be integrally formed with the upper platform 24.

The sole structure 10 may also include an outsole (not shown) along the bottom surface 54 of the midsole shell 22. The outsole forms the outer exposed part of the sole structure 10 that comes into contact with the ground. The outsole includes the tread design. The outsole may be formed integrally with the midsole structure 20. Alternatively, the outsole may be attached to the bottom surface 54 of the sole structure 10 with glue, cement, sewing, interlocking or any other suitable attachment.

In addition to forming the cushion elements 40 concurrently in one process together with the shell 22, 3D printing allows the cushion elements to be printed with various cushion characteristics based on the shape, size, density, hardness or elasticity of the cushion elements 40.

The 3D printing process can use various 3D printing or additive manufacturing methods to form the sole structure 10 such as selective laser sintering (SLS), stereolithography (SLA) or fused deposition modelling (FDM) or other suitable 3D printing or additive manufacturing methods.

A 3D printer uses a print head to apply material onto a surface. The 3D printer builds the sole structure 10 in layer-by-layer construction. The 3D printer may be capable of applying multiple printable materials. For example, the printable materials could be acrylic, plastic, or other polymeric material, or other combinations of materials. For example, the additively manufactured sole structure 10 may use printed material including polyether block amide (PEBA), thermoplastic polyurethane (TPU), or polyolefins such as polyethylene (PE), polystyrene (PS) and/or polypropylene (PP). The 3D printing process may also use a mixture of different materials (from different classes of materials or from the same class of materials with slightly different properties) for additive manufacturing. The printed materials may be any color or may be clear, translucent, or opaque.

The midsole structure 20 of the present application provides for three-dimensional printing of the midsole shell 22 and cushion elements 40 in just one additive manufacturing/3D printing process. The additive manufacturing or 3D printing process includes printing the midsole shell 22 and cushion elements 40. The process may include removing the midsole structure 20 from the printing plate and disposing of excess base material using dust-off processing or dissolving unfused soluble materials.

The plurality of cushion elements 40 may be formed of at least two different densities. The plurality of cushion elements 40 may have a first group of cushion elements having a first density and a second group of cushion elements having a second density different than the first density.

The first and second densities may be formed, for example, with a first printable material having a first density and a second printable material having a second density different from the first printable material.

The cushion elements 40 may also be formed of solid and hollow elements. In this way, the cushion elements being solid or hollow may have different density and/or elasticity characteristics. The 3D printing uniquely allows the cushion elements to be formed as hollow elements, where it would be difficult to achieve hollow cushion elements by other manufacturing process.

In yet another embodiment, the cushion elements 40 may have differences in size and shape, in particular different diameters, and different geometric forms, including but not limited to spheres, polyhedrons, ellipsoids, or lemons.

In another embodiment, the hardness grades of the cushion portion 38 of the sole structure 10 may be varied according to the wearer's preferences or choices. The hardness grades can be adjusted by several options. In one embodiment, the hardness grade may be adjusted by 3D printing the cushion elements 40 with smaller diameters to limit the elastic deformation and travel of the cushion elements 40 and therefore increasing the hardness grade of the cushion portion 38. In one embodiment, the cushion elements 40 may have a diameter in the range of 2 mm to 10 mm. In another embodiment, cushion elements 40 may have any suitable size or diameter.

The hardness grade of the sole structure 10 may be adjusted by printing cushion elements 40 having larger diameters to increase the elastic deformation of the cushion elements 40 and therefore decreasing the hardness grade of the cushion portion 38 to create a softer sensation for the wearer of the article of footwear. In one embodiment, the cushion elements 40 may have a larger diameter.

In yet another embodiment, the hardness grade of the bottom unit may be adjusted by printing the overall density of the cushion elements 40 within the cavity 28. The overall density of the cushion elements 40 may be varied based on the density of each cushion element 40, as well as the size and number of cushion elements. Any combination of cushion elements 40 with different overall densities within the midsole cavity 28 may be used to customize the elasticity value and the hardness grade. The 3D printing process may allow the configuration of cushion elements 40 to be arranged to be a specific density that could not be achieved with merely separately filling the cavity with cushion elements 40.

Furthermore, the hardness may also be adjusted by varying the ratio of hollow and solid cushion elements within the midsole. Since solid cushion elements may have less elasticity compared to hollow cushion elements, a ratio of solid cushion elements to hollow cushion elements less than 0.5 provides a stiffer and harder sole structure, while a ratio of solid cushion elements to hollow cushion elements greater than 0.5 creates a softer and less hard sole structure 10.

In yet another embodiment, the cushion elements 40 may not have solid surfaces and may have a webbed or net surface. For example, a cushion element may be formed like a spherical net.

In a further embodiment, the cushion elements 40 may be 3D printed so that a first cushion element is entirely surrounded by a second hollow cushion element. This encapsulated design allows for the formation of different hardness cushion elements with several stages of hardness or elasticity values.

The cushion elements 40 may include a combination of these cushion characteristics to adjust the hardness in the midsole structure 20. For example, the cushion elements 40 may include a combination of small solid cushion elements and large hollow cushion elements within the midsole cavity 28 of the midsole structure 20 of the article of footwear.

The midsole structure 20 may also use a combination of the cushion characteristics to provide varying hardness in different regions, such as a forefoot region 60, an arch region 62 or a heel region 64. For example, the midsole structure 20 may include cushion elements 40 with greater hardness in the arch region 62 to provide optimized arch support, while providing softer and/or more elastic cushion elements in the forefoot region 60 or the heel region 64.

Three-dimensional printing allows the midsole shell to be customized to the wearer and allows numerous variations without having to procure traditional tooling and associated long lead times and expenses required by traditional manufacturing methods like mold tools, for example. The method of manufacturing the sole structure 10 allows for receiving the wearer's preferences and three-dimensional printing the plurality of cushion elements to have a variable cushion characteristic based on the input of wearer's preferences.

The wearer's preferences may include the shape of the upper platform 24. For example, the upper platform 24 and/or integral insole may be contoured for the user's foot or sized to the wearer's foot including length, width, or other upper platform features. The wearer's preferences may also include desired cushion characteristics of the cushion elements 40, as discussed above, including density, shape, size, hardness and elasticity.

The sole structure 10 may then be attached to a shoe upper to form a shoe and footwear.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sole structure for a shoe, comprising:
a midsole structure comprising:
    a midsole shell having an upper platform and lower platform integrally formed as one piece to define a cavity therebetween; and
    a plurality of cushion elements retained in the cavity, wherein each of the plurality of cushion elements is movable independently in the cavity, wherein the upper platform has a plurality of apertures that extend from the upper platform through to the cavity, wherein each of the plurality of apertures is sized smaller than each one of the plurality of cushion elements in at least one dimension so as to retain the plurality of cushion elements within the cavity and such that at least one of the plurality of cushion elements is exposed through at least one of the plurality of apertures for direct contact with a wearer's foot in a donned state by extending at least partially from inside the cavity present between the integrally formed upper platform and lower platform to at least partially outside the cavity present between the integrally formed upper platform and lower platform.

2. The sole structure according to claim 1, wherein the upper platform comprises an upper surface defining a footbed contoured to receive the wearer's foot.

3. The sole structure according to claim 1, wherein the midsole shell extends from a heel portion to a toe portion, wherein the midsole shell further comprises a medial side portion and a lateral side portion extending between the upper platform and the lower platform.

4. The sole structure according to claim 3, wherein the midsole shell defines the cavity as an enclosed cavity formed between the medial side portion, the lateral side portion, the upper platform, and the lower platform, wherein the plurality of cushion elements are contained in the enclosed cavity.

5. The sole structure according to claim 1, wherein the plurality of cushion elements comprise a first group of cushion elements having a first density and a second group of cushion elements having a second density different than the first density.

6. The sole structure according to claim 1, wherein the plurality of cushion elements comprise a first group of cushion elements being solid and a second group of cushion elements being hollow.

7. The sole structure according to claim 1, wherein the plurality of cushion elements have a generally spherical shape.

8. The sole structure according to claim 1, wherein the plurality of cushion elements are formed of at least two different shapes or two different sizes.

9. The sole structure according to claim 1, further comprising an outsole attached to the midsole structure.

10. A sole structure for a shoe, comprising:
a midsole structure integrally formed with a 3D printing process, comprising:
    a midsole shell having an upper platform and lower platform integrally formed as one piece with the 3D printing process to define a cavity therebetween; and
    a cushion portion formed by the 3D printing process and retained in the cavity separate from the midsole shell,
    wherein the upper platform has a plurality of apertures that extend from the upper platform through to the cavity, and
    wherein each of the plurality of apertures is sized smaller than the cushion portion in at least one dimension so as to retain the cushion portion within the cavity and such that the cushion portion is exposed through at least one of the plurality of apertures for direct contact with a wearer's foot in a donned state.

11. The sole structure according to claim 10, further comprising an outsole integrally formed with the midsole structure by the 3D printing process.

12. The sole structure according to claim 10, wherein the cushion portion comprises a plurality of cushion elements comprising a first group of cushion elements having a first cushion characteristic and a second group of cushion elements having a second cushion characteristic that varies from the first cushion characteristic, wherein the first and second cushion characteristics comprise at least one of density, shape, size, hardness, and elasticity.

13. The sole structure according to claim 12, wherein each of the plurality of cushion elements is movable independently in the cavity.

14. The sole structure according to claim 10, wherein the cushion portion is exposed through at least one of the plurality of apertures for direct contact with the wearer's foot in the donned state by extending at least partially from inside the cavity present between the integrally formed upper platform and lower platform to at least partially outside the cavity present between the integrally formed upper platform and lower platform.

15. A shoe comprising:
a shoe upper, and
a midsole structure attached to the shoe upper, the midsole structure comprising:

a midsole shell having an upper platform and lower platform integrally formed as one piece enclosing an internal cavity therebetween; and a plurality of cushion elements retained in the cavity, wherein each of the plurality of cushion elements retained in the cavity is separate from the midsole shell, wherein the upper platform comprises a plurality of apertures that extend from the upper platform through to the cavity, wherein each of the plurality of apertures is sized smaller than each of the plurality of cushion elements in at least one dimension so as to retain the plurality of cushion elements within the cavity and such that at least one of the plurality of cushion elements is exposed through at least one of the plurality of apertures for direct contact with a wearer's foot in a donned state.

16. The shoe according to claim 15, further comprising an outsole attached to the midsole structure.

17. The shoe according to claim 15, further comprising an outsole integrally formed as the one piece with the midsole structure.

18. The shoe according to claim 15, wherein the plurality of cushion elements are movable independent in the cavity from the midsole shell.

19. The shoe according to claim 15, the cushion elements are exposed through the apertures for direct contact with the wearer's foot in the donned state by extending at least partially from inside the cavity present between the integrally formed upper platform and lower platform to at least partially outside the cavity present between the integrally formed upper platform and lower platform.

20. The shoe according to claim 15, wherein the plurality of cushion elements comprise a first group of cushion elements have a first cushioning characteristic and a second group of cushion elements have a second cushioning characteristic being different than the first cushioning characteristic.

* * * * *